United States Patent

Hardison et al.

[15] 3,704,569

[45] Dec. 5, 1972

[54] SYSTEM FOR CONDITIONING FLUE GAS WITH H2SO4

[72] Inventors: Leslie C. Hardison; Salvatore A. Guerrieri, both of Norwalk, Conn.

[73] Assignee: Universal Oil Products Company, Des Plains, Ill.

[22] Filed: April 2, 1970

[21] Appl. No.: 25,044

[52] U.S. Cl. ................................55/4, 55/5, 55/11, 55/106, 55/135
[51] Int. Cl. ...........................................B03c 3/01
[58] Field of Search............55/4, 5, 6, 7, 8, 9, 10, 11, 55/106, 122, 134, 135; 23/2, 2 C, 175; 75/1

[56] References Cited

UNITED STATES PATENTS

| | | | |
|---|---|---|---|
| 1,016,476 | 2/1912 | Cottrell | 55/5 X |
| 1,329,737 | 2/1920 | Walcott | 55/10 |
| 1,441,713 | 1/1923 | Prosser | 55/5 |
| 1,820,734 | 8/1931 | Feldmann | 55/106 |
| 1,909,825 | 5/1933 | Hahn et al. | 55/4 |
| 2,602,734 | 7/1952 | Hedberg et al. | 75/1 |
| 2,706,533 | 4/1955 | Hedberg et al. | 55/4 |
| 2,864,456 | 12/1958 | Hall et al. | 55/134 X |
| 3,581,463 | 6/1971 | Roberts | 55/136 X |
| 2,659,449 | 11/1953 | Kaiser et al. | 55/134 X |
| 1,811,797 | 6/1931 | Lechler | 23/178 |
| 1,828,646 | 10/1931 | Dantsizen | 55/10 X |
| 1,971,855 | 8/1934 | Heimrod | 55/73 X |
| 2,746,563 | 5/1956 | Harlow | 23/2 C |

FOREIGN PATENTS OR APPLICATIONS

| | | | |
|---|---|---|---|
| 700,869 | 12/1964 | Canada | 55/101 |
| 134,593 | 10/1919 | Great Britain | 55/11 |
| 144,701 | 6/1920 | Great Britain | 55/11 |
| 344,550 | 3/1931 | Great Britain | 55/10 |
| 932,895 | 7/1963 | Great Britain | 55/134 |
| 27,097 | 5/1932 | Netherlands | 55/135 |

*Primary Examiner*—Dennis E. Talbert, Jr.
*Attorney*—James R. Hoatson, Jr. and Philip T. Liggett

[57] ABSTRACT

In order to preclude resistance of entrained fine particles to collection within electrical precipitator means, there is a conditioning of the particles carried in the flue gas stream by having vaporized and decomposed $H_2SO_4$ condensed and adsorbed on the particles themselves. Sulfuric acid is mixed and vaporized with a hot gaseous stream at a temperature above 400° F. and then the resulting hot stream with decomposed $H_2SO_4$ is introduced uniformly into the flue gas stream at a zone ahead of the precipitator unit so that the acid can reform and condense on the particles.

6 Claims, 1 Drawing Figure

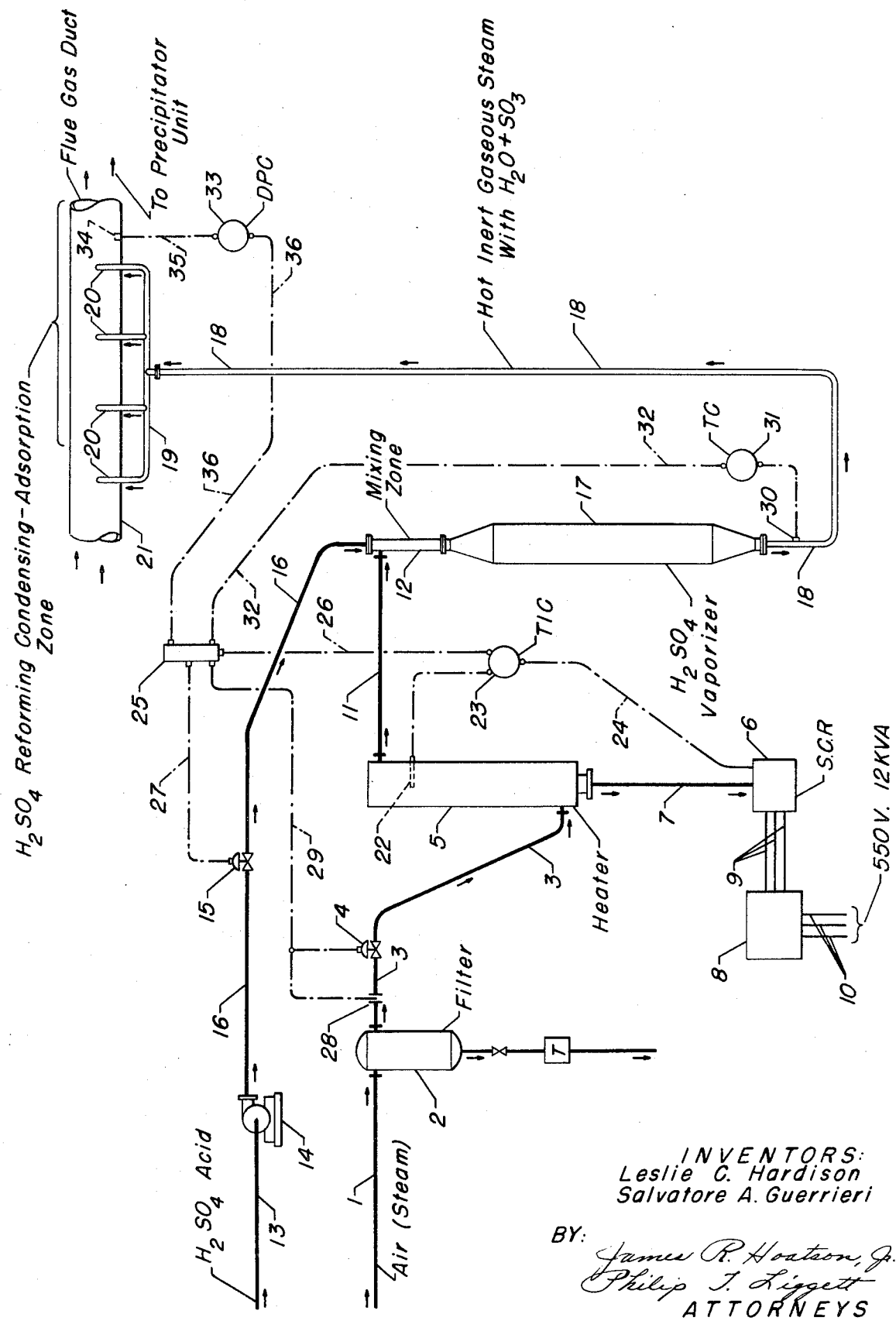

SYSTEM FOR CONDITIONING FLUE GAS WITH H2SO4

This invention relates to a conditioning system for preparing and introducing a hot gaseous stream containing sulfuric acid ($H_2SO_4$) into a particle laden flue gas stream so as to substantially reduce the resistivity of fine particulates to in turn enhance their removal from gas stream in electrical precipitator means. More particularly, the present improved system provides for vaporizing $H_2SO_4$ or substantially decomposing the acid into water and $SO_3$ at a temperature above about 400° F. and then permitting a subsequent reforming of $H_2SO_4$ on the surface of the fly ash particles ahead of the electrical precipitator means in a cooler flue gas stream that is just above the dew point temperature level for the particular gas-acid mixture.

BACKGROUND OF THE INVENTION

It has been found, and it is quite well known, that fly ash containing streams from the burning of coal, or from the burning of any fossil fuels, will have a certain amount of electrical resistance of "resistivity" developed in the particles such that an inefficient electrical precipitation thereby results. Flue gas streams will have sulfur dioxide ($SO_2$) present but it appears that $SO_2$ neither aids nor abets the desired electrical precipitation operation. On the other hand, it has been found that a sufficient quantity of $SO_3$ or $H_2SO_4$ present in the gas stream or with the fly ash will lower the resistivity of the particles to giving up their electrostatic charges and good precipitation results can be obtained.

In connection with fly ash resistivity to collection, it is also generally known that there is an accompanying problem of "back discharge" or "back corona." Actually, the high dust resistivity situations result in arcing across the dust layer and there will be inadequate voltage gradient around the discharge electrode to maintain corona, current surges, and many other problems, which prevent the normal process of charging the dust particles and collecting them effectively.

As a result, it may be considered a principal object of the present invention to provide flue gas conditioning in a manner where $H_2SO_4$ is vaporized or decomposed and then reformed primarily as condensate or as an adsorbed mono-layer on the fly ash particles ahead of the precipitator unit so as to in turn effect reduction of particle resistivity and an improved electrical precipitation of the particulates.

A further object of the invention is to provide an air-acid mixing and introduction system for handling the $H_2SO_4$ ahead of the electrical precipitator unit so that corrosion problems are minimized throughout the overall system and such that acid flow can be cut back in the event of dew point or low temperature problems.

In a broad aspect, the present invention provides in connection with the conditioning of a flue gas stream ahead of an electrical precipitator means in order to overcome resistivity of entrained fine particles to collection, the improved method of operation which comprises the steps of: (a) introducing $H_2SO_4$ into a hot gaseous stream above about 400° F. to effect vaporization and/or substantial decomposition thereof, (b) introducing the resulting hot gaseous stream with vaporized decomposition products into a dust ladened flue gas stream passing through duct means to the precipitator means, (c) providing acid reforming and adsorption temperature conditions for said flue gas stream in said duct means, and (d) permitting condensation and adsorption of $H_2SO_4$ onto the particles carried in said flue gas stream ahead of the electrical precipitator means to thereby substantially reduce the resistivity of said particles to collection within said precipitator means.

Generally, the hot gaseous stream may comprise air which has been heated to the order of 470° F., or more, in order that it may mix with injected sulfuric acid and effect the desired vaporization or decomposition of the acid into water and sulfur trioxide, i.e. a gasification which may comprise ($H_2SO_4 \rightarrow H_2O + SO_3$). Alternatively, in a similar type of operation, high pressure super-heated steam which is at an equivalent high temperature that will effect the vaporization of the $H_2SO_4$ can be used to mix with the injected acid and carry to a confined vaporizing zone so as to effect the desired substantially complete gasification of the $H_2SO_4$. The mixing and vaporizing zones will generally be glass lined and of an elongated nature so as to permit an efficient intermixing of the hot gaseous stream with the acid and the substantial gasification of the acid. The hot gaseous stream and the vapors will then be carried through glass lined pipes or other corrosion resistant tubes to a suitable header means which will be used to uniformly distribute the entire mixture into the large duct carrying the flue gas and entrained fly ash to an electrical precipitator. At a zone just ahead of the precipitator means, the flue gas stream and the entrained fly ash will normally be at a substantially lower temperature level than the hot gaseous and vaporous stream, such that the latter can be reformed or condensed and adsorbed onto fly ash particles in the flue gas duct condensation zone ahead of the electrical precipitator means. In any event, the main flue gas stream shall generally be maintained at a temperature level of about 270° to 325° F. such that there are the proper condensing or reforming conditions for the $H_2SO_4$ to be adsorbed as a mono-molecular layer onto the entrained particles.

In one aspect, the quantity of acid which will be introduced into the flue gas stream shall be sufficient to give the equivalent of about 20 parts per million (ppm) of sulfur trioxide in the flue gas, or at least in the range of about 10 to 30 ppm of $SO_3$ in the flue gas by volume. The $SO_2$ content of a main flue gas stream from a coal burning unit will be of the order of approximately 500 ppm so that it will be seen that the amount of sulfuric acid, as measured by $SO_3$ content, will be less than about one-tenth of the $SO_2$ content, or roughly of the order of about one-twentieth of the $SO_2$ content. In order to overcome resistivity, it also has been found desirable to increase the water soluble sulfate level on fly ash particles in a flue gas stream and it appears that an equivalent to increased sulfate level may be obtained by the adsorption of $H_2SO_4$ onto the particulates.

From the physical properties aspect, sulfuric acid will vaporize and/or gasify at a temperature of the order of about 270° F. and a substantially complete gasification which comprises vaporization and/or decomposition is effected at a temperature level of the order of about 450° F. Thus, as previously set forth, it is desirable that a hot gaseous heating and transporting stream be used in the sulfuric acid mixing and/or vaporizing zone which is at a temperature level above about 400° F. and preferably of the order of about 470° F. so as to be above the 450° F. acid vaporizing and gasifying temperature and provide rapid disassociation.

A preferred operation system also makes use of automatic control means such that if a hot gas temperature of above 400° F. is not maintained there will be a cut back of the acid flow and the prevention of raw acid being carried through the vaporizing zone and transfer lines into the flue gas duct. A still further control means in the system may provide for a temperature sensor and control means, or dew point measuring means, to be used at the zone of the manifold introducing means associated with the flue gas duct so that in the event that the hot gaseous stream with the vaporized $H_2SO_4$ falls to a temperature level below the dew point for the mixture there will be means for cutting off the acid flow into the system. Still other temperature indicator and control means may be utilized to insure maintaining an adequate high level temperature at the heating zone for the hot gaseous stream carrying into the mixing and vaporizing zone for effecting the gasification of the injected sulfuric acid stream.

Generally, the weight ratio of the hot air stream with respect to the acid will be of the order of about 15 to 35. For example, where there is 12.5 pounds per hour of acid to 230 pounds per hour of air introduced to the mixing-vaporizing zone, there will be a weight ratio of air to acid of $230/12.5 = 18.4$. In any case, for the operation of the system, the temperature obtained at the point of introduction of the hot air-vaporized acid should not be less than the dew point of the particular air-acid mixture which is being fed to the flue gas stream. The following table indicates a dew point in °F., for varying weight ratios of air to acid.

Weight Ratio, Air/Acid 42, 35, 29.5, 24.6, 20.4, 17
Dew Point, °F. 390, 400, 410, 420, 430, 440

From the foregoing it will be seen that with a 12.5 pound per hour feed rate for acid, based on 98 percent sulfuric acid, there should be a temperature of above about 435° F. for the air-acid mixture to stay above the dew point.

With reference to the accompanying drawing and to the following description thereof, there is shown diagrammatically and in a flow chart manner one embodiment of the present improved system for effecting the addition of sulfuric acid into a flue gas stream so as to effect the desired conditioning of fly ash particles in that stream ahead of electrical precipitator means. In order not to complicate the drawing, the furnace or boiler means and the electric precipitator apparatus have not been shown therein.

Referring now to the drawing, there is shown air being introduced into line 1 and through filter means 2 into line 3, having valve 4, and thence into a heater 5. The heater unit 5 is illustrated as being heated from the use of a saturatable core reactor 6 which is connected through line means 7. The reactor 6 is in turn indicated as receiving electrical energy from a transformer 8 by way of line means 9, while a 550 volt-12 KVA electrical source is shown by line means 10 connecting to the transformer 8.

The air within heater means 5 is raised to a temperature level above 400° F. and preferably to the order of about 470° F., so that air transferred by way of line 11 to a mixing zone 12 will be at a level suitable to effect the rapid vaporizing or decomposition of the $H_2SO_4$ being introduced by way of line 16. In the present embodiment, sulfuric acid is provided by way of line 13, pump 14, control valve 15 and line 16 into the end of the mixing zone 12. The latter in turn introduces a mixture of the hot air stream and acid into the end of a vaporizing zone 17 which discharges the resulting substantially decomposed acid stream into transfer line 18. As indicated, the vaporizer 17 should be of an elongated construction adequate to provide a suitable time period to effect the substantially complete gasification of the acid. The chamber 17 and the transfer line 18 should be glass lined or of a suitable acid resistant material to preclude corrosion from the acidic stream. In addition, the vaporizer 17 and the transfer line 18 should be well insulated in order to prevent any substantial heat loss from the air-acid mixture carrying onto the flue gas duct.

The present drawing indicates diagrammatically that line 18 connects with a discharge manifold pipe 19 in turn having a plurality of branch lines 20 that connect with and discharge into the interior of the main flue gas duct 21. Thus, the vaporized acid is introduced by way of a plurality of pipes 20 into the interior of duct 21 and into the main flow of the flue gas stream that will, in turn, discharge into downstream electrical precipitator unit (not shown in the drawing). The plurality of introduction points from pipes 20 and a uniform introduction of decomposed acid into the main flue gas stream provides for the desired subsequent condensation and adsorption of the $H_2SO_4$ onto fly ash particles within the gas stream. From a practical aspect, there shall be at least a short segment of flue gas duct, as a condensing-adsorption zone, between the points of introduction of the air-acid mixture and the electrical precipitator unit so as to provide for a reforming and condensing of the acid onto fly ash particles.

It is not intended to limit the temperature of the flue gas stream in duct means 21 to any exact or fixed temperature level; however, such stream and the entrained fly ash particles should be at a temperature level just above the dew point for gas-acid mixture resulting in the adsorption zone and generally from about 270° to 325° F. so as to permit the condensation of acid or the reforming of any decomposed acid as a mono-molecular adsorption thereof on the entrained particles. Although the actual introduction of a certain amount of $SO_3$ into the electrical precipitator zone will have no detrimental effects and will be of advantage in conditioning the main flue gas stream to overcome resistivity of entrained particles at the collection electrodes of the precipitator unit, it is believed to be of more benefit to "condition" the particles themselves in accordance with the present invention. As set forth hereinbefore, in order to obtain efficient separation of entrained particles, it is necessary to have the fly ash lessen their resistivity ahead of the collection electrodes whereby they will be neutralized and fall into the collection bins. This will, of course, substantially eliminate the other accompanying operational problems such as "back corona" which can occur with a build up of a resistive type fly ash on the electrodes.

In order to insure the desired controlled and trouble-free operation of the present conditioning system, there has been provided temperature indicator means 22 in combination with the heater 5 and a temperature indicator controller 23 which in turn connects with the core reactor 6 by means 24 and to relay means 25 by way of line 26 so that an adequate level of heat input will be maintained for heating the hot gaseous stream passing through the heater 5. At the same time a safety means provided by a control line 27 carrying from relay 25 to valve 15 can cut back the acid flow in line 16 in the event that the temperature level from heater 5 falls below a predetermined non-acid vaporizing temperature. The control system should also provide flow measuring means 28 in the filtered air line 3 carrying to the control valve 4 and in interconnection to the relay means 25 by way of line 29 such that there will be a proper and controlled quantity of air introduced into heater 5 and into the mixing zone 12 to in turn maintain a desired air-acid ratio.

As additional control means, the present improved fly ash conditioning system provides that a temperature indicator 30 at the outlet portion of the acid vaporizer 17 will connect to a temperature controller 31 and the latter, by way of line 32, connect to relay means 25 whereby the introduction of acid can be cut down in the event of a reduced temperature for the air-acid mixture. In still another control arrangement, there may be provided a temperature control means, or a dew point analyzer means, such as 33 to connect from a sensor 34 in duct 21 through lines 35 and 36 to relay means 25. There is thus provided a still further means for reducing or cutting off acid flow in line 16 in the event that the dew point level is reached or approached within the duct 21 whereby undesired corrosive conditions could be provided. In other words, when having a given quantity of air, in the event that there is a variation in the weight ratio between air and acid so that a dew point is being approached, then there should be a reduction in the acid injection rate or, alternatively, an increase in the temperature level from heater 5. By way of a specific example, where the air to acid weight ratio is of the order of 20.4 then the temperature to preclude reaching a dew point should be above 430° F. and preferably at a temperature range in the order of 470° to 490° F. Where a greater amount of acid is used, then there should be a still higher temperature level for the air-acid mixture. Conversely, where a lesser amount of acid is used, then the temperature level can be lower to correspond with a lowering of the dew point temperature.

It is to be understood that the present drawing is diagrammatic and that various modification may be made in the flow scheme, as well as with respect to particular portions of the apparatus in the system. For instance, the heating within chamber 5 may be accomplished by a heater coil combined with the heater zone in lieu of the "saturated core reactor" arrangement. Also, it is not intended to limit the method initially mixing the air and acid streams to any one type of mixer or vaporizing means inasmuch as various types of mixing nozzles or baffled zones may be provided to effect the ultimate desired vaporization or gasification of the $H_2SO_4$. Still further, in a practical aspect, it is desirable that the acid vaporizing portion of the system be positioned relatively close to the main flue gas duct so as to preclude the use of a long transfer line for carrying the hot gas stream and acid from the vaporizing zone to the fly ash laden gas stream in the flue gas duct. With regard to a system that uses superheated steam in lieu of heated air, there may, of course, be an elimination of the hot air heating zone and the electrical system for effecting the controlled heating of that zone.

We claim as our invention:

1. In conditioning a particle laden flue gas stream prior to electrical precipitation to overcome resistivity of entrained fine particles during precipitation, the improved method of operation which comprises the steps of:
   a. vaporizing sulfuric acid by introducing the acid into a hot gaseous stream which is at a temperature above about 400° F;
   b. introducing the hot gaseous stream containing said vaporized sulfuric acid into a particle laden flue gas stream at a temperature which is not less than the dew point of the sulfuric acid-containing hot gaseous stream;
   c. effecting condensation and adsorption of the sulfuric acid onto the particles at a temperature substantially below the vaporization temperature level for sulfuric acid and just above the dew point level of the flue gas stream and sulfuric acid-containing hot gaseous stream mixture of step (b);
   d. and precipitating the particles of step (c) by electrical precipitation.

2. The method of claim 1 further characterized in that condensation and adsorption is effected at a temperature of about 270° F. to about 330° F.

3. The method of claim 1 further characterized in that the hot gaseous stream is air and the rate at which sulfuric acid is introduced into said air is decreased where the temperature level of the hot gaseous air stream containing vaporized sulfuric acid falls below the dew point of the air-acid mixture.

4. The method of claim 1 further characterized in that said hot gaseous stream is air and the sulfuric acid is introduced into said heated air stream in an amount to provide a weight ratio of air to acid in the range of about 17 to about 40.

5. A system for conditioning a fly ash laden flue gas prior to electrical precipitation comprising:
   a. heater means for heating air to a temperature above 400° F;
   b. air inlet means connected to said air-heating means for introducing air into said air heating means;
   c. means for passing a heated air stream from said air-heating means to a mixing-vaporizing means;
   d. mixing-vaporizing means for mixing heated air and sulfuric acid at sulfuric acid vaporizing conditions connected to the heated air stream passing means of (c), said mixing-vaporizing means having a vaporizing zone of an elongated construction relative to the flow of the air and sulfuric acid mixture such that the residence time of said mixture is suitable to effect the substantially complete gasification of the sulfuric acid;
   e. outlet means connected to the mixing-vaporizing means for transferring the hot gas-vaporized acid stream produced in step (d) to a manifold means;

f. control valve means connected to the mixing-vaporizing means whereby sulfuric acid is introduced into said mixing-vaporizing means;
g. temperature indication and control means connected with and responsive to the temperature in said mixing-vaporizing means and connected with said control valve means, whereby acid flow may be regulated responsive to a temperature level from said mixing-vaporizing means;
h. manifold means connected to the outlet means of (e), said manifold means having connective means for discharging hot gas-vaporized acid stream into a flue gas duct;
i. a flue gas duct, connected to the connective means of the manifold means, whereby condensation of acid or reforming of decomposed acid as a monomolecular adsorption thereof on fly ash laden flue gas within the duct is effected thereby lessening the resistivity of the fly ash prior to electrical precipitation.

6. The system of claim 5 further characterized in that dew point indicator means communicates with the interior of said manifold means and control means from the dew point indicator means communicates with the control valve means in the acid introduction means to the mixer-vaporizer means, whereby acid flow may be varied responsive to readings from said dew point indicator means.

* * * * *